United States Patent
Goraj et al.

(10) Patent No.: US 11,489,395 B2
(45) Date of Patent: Nov. 1, 2022

(54) ELECTRIC MACHINE HAVING A PLURALITY OF CLOSING DEVICES FOR CLOSING RESPECTIVE INTERMEDIATE SPACES IN RELATION TO AN AIR GAP, AND PRODUCTION METHOD

(71) Applicant: Rolls-Royce Deutschland Ltd & Co KG, Blankenfelde-Mahlow (DE)

(72) Inventors: Robert Goraj, Erlangen (DE); Izabela Kuder, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 93 days.

(21) Appl. No.: 16/967,485

(22) PCT Filed: Feb. 7, 2019

(86) PCT No.: PCT/EP2019/053036
§ 371 (c)(1),
(2) Date: Aug. 5, 2020

(87) PCT Pub. No.: WO2019/158432
PCT Pub. Date: Aug. 22, 2019

(65) Prior Publication Data
US 2021/0218308 A1 Jul. 15, 2021

(30) Foreign Application Priority Data

Feb. 13, 2018 (DE) .......................... 102018202175.9
Jun. 28, 2018 (DE) .......................... 102018210551.0

(51) Int. Cl.
*H02K 3/48* (2006.01)
*H02K 3/487* (2006.01)
(Continued)

(52) U.S. Cl.
CPC .............. *H02K 3/487* (2013.01); *H02K 9/197* (2013.01); *H02K 15/0018* (2013.01)

(58) Field of Classification Search
CPC .......... H02K 3/493; H02K 1/22; H02K 3/487; H02K 15/0018; H02K 15/08; H02K 9/197
See application file for complete search history.

(56) References Cited

U.S. PATENT DOCUMENTS 4,075,522 A 2/1978 Hoffman
10,971,975 B2 * 4/2021 Ronning .................. H02K 3/18
(Continued)

FOREIGN PATENT DOCUMENTS

DE  102011078025 A1  12/2012
DE  202016004885 U1  8/2016
(Continued)

OTHER PUBLICATIONS

German Office Action for German Application No. DE 10 2018 210 551.0 dated Feb. 20, 2020.
(Continued)

*Primary Examiner* — Leda T Pham
(74) *Attorney, Agent, or Firm* — Lempia Summerfield Katz LLC

(57) ABSTRACT

The disclosure relates to an electric machine including a stator having a plurality of teeth and on which a winding of the electric machine is arranged, wherein a respective intermediate space is formed between neighboring teeth. The electric machine further includes a rotor that may rotate relative to the stator, wherein an air gap is formed between the stator and the rotor. The electric machine further includes a plurality of closing devices for closing the respective intermediate spaces in relation to the air gap, and wherein a
(Continued)

respective closing device of the plurality of closing devices is arranged between neighboring teeth of the stator.

19 Claims, 1 Drawing Sheet

(51) Int. Cl.
*H02K 9/197* (2006.01)
*H02K 15/00* (2006.01)

(56) References Cited

U.S. PATENT DOCUMENTS

| | | | |
|---|---|---|---|
| 2002/0074889 A1* | 6/2002 | Kikuchi | H02K 3/522 310/214 |
| 2003/0042817 A1 | 3/2003 | Tsuneyoshi | |
| 2014/0167555 A1* | 6/2014 | Mims | H02K 1/16 310/216.001 |
| 2015/0311762 A1* | 10/2015 | Chai | H02K 3/325 310/215 |
| 2019/0372416 A1* | 12/2019 | Anghel | H02K 1/165 |

FOREIGN PATENT DOCUMENTS

| | | | | |
|---|---|---|---|---|
| DE | 102015225189 A1 | | 6/2017 | |
| EP | 2706649 A1 | | 3/2014 | |
| GB | 1135242 A | * | 12/1968 | ............... H02K 3/48 |
| GB | 2503480 A | | 1/2014 | |
| JP | 2003070199 A | | 3/2003 | |

OTHER PUBLICATIONS

International Search Report and the Written Opinion for International Patent Application PCT/EP2019/053036 dated May 6, 2019.

* cited by examiner

ELECTRIC MACHINE HAVING A PLURALITY OF CLOSING DEVICES FOR CLOSING RESPECTIVE INTERMEDIATE SPACES IN RELATION TO AN AIR GAP, AND PRODUCTION METHOD

The present patent document is a § 371 nationalization of PCT Application Serial No. PCT/EP2019/053036, filed Feb. 7, 2019, designating the United States, which is hereby incorporated by reference, and this patent document also claims the benefit of German Patent Application No. 10 2018 202 175.9, filed Feb. 13, 2018, and German Patent Application No. 10 2018 210 551.0, filed Jun. 28, 2018, which are also hereby incorporated by reference.

TECHNICAL FIELD

The present disclosure relates to an electric machine including a stator having a plurality of teeth and on which a winding of the electric machine is arranged, wherein a respective intermediate space is formed between neighboring teeth. Moreover, the electric machine includes a rotor, which may rotate relative to the stator, wherein an air gap is formed between the stator and the rotor. In addition, the present disclosure relates to a method for producing an electric machine of this kind.

BACKGROUND

Electric machines in which a cooling liquid is used to cool the coils of the stator are known from the prior art. In such machines, a split tube is inserted between the stator and the rotor. In this arrangement, the split tube is arranged in the air gap or in the magnetic air gap region. This split tube serves to prevent the cooling liquid crossing from the stator into the mechanical air gap and ultimately to the rotor. As a result, the split tube is subjected to the associated pressure and temperature loads.

There are partially conflicting design requirements for the split tube. On the one hand, the split tube is made as thin as possible in order to keep the magnetic air gap as small as possible. This is desirable for reasons of a high-power density of the electric machine. At the same time, the minimum thickness of the component is limited by its mechanical loading, namely, in particular, due to design for stability against buckling. On the other hand, the split tube may be formed from an electrically insulating material. This is because, if electrically conductive materials were used in the magnetic air gap, eddy currents would be induced, leading to additional electromagnetic losses.

SUMMARY AND DESCRIPTION

It is an object of the present disclosure to indicate a solution as to how the magnetic air gap of an electric machine of the type stated at the outset, (e.g., a liquid-cooled electric machine), may be reduced in a simple manner.

According to the disclosure, this object is achieved by an electric machine and by a method as disclosed herein. The scope of the present disclosure is defined solely by the appended claims and is not affected to any degree by the statements within this summary. The present embodiments may obviate one or more of the drawbacks or limitations in the related art.

An electric machine includes a stator, which has a plurality of teeth. Moreover, a winding of the electric machine is arranged on the stator. In this arrangement, a respective intermediate space may be formed between neighboring teeth. Moreover, the electric machine includes a rotor, which is rotatable relative to the stator, wherein an air gap is formed between the stator and the rotor. In addition, the electric machine includes a plurality of closing devices for closing the respective intermediate spaces in relation to the air gap. In this example, a respective closing device of the plurality of closing devices is arranged between the neighboring teeth.

The electric machine includes the stator, which may have a stator core with a corresponding lamination stack. In addition, the electric machine includes the winding. The winding may have a plurality of coils, which are arranged on the teeth or stator teeth. The coils may be designed in such a way that a single-tooth winding is obtained. An intermediate space is formed between the respective teeth or between the neighboring teeth. In addition, the electric machine includes the rotor, which is designed to be rotatable relative to the stator. Moreover, the rotor may be formed internally with respect to the stator. The air gap is formed between the stator and the rotor. The electric machine is, in particular, a liquid-cooled electric machine. This means that there is a cooling liquid between the teeth of the stator in the respective intermediate spaces. This cooling liquid serves, in particular, to dissipate from the coils the heat generated during the operation of the electric machine.

According to the disclosure, it is envisaged that the electric machine has a plurality of closing devices. These closing devices serve to close the respective intermediate spaces between the teeth with respect to the air gap between the stator and the rotor. Thus, the respective closing devices may be designed to seal the respective intermediate spaces with respect to the air gap. In particular, the respective closing devices are designed in such a way that they are leak-tight for the cooling liquid that is in the intermediate spaces. In this example, it is furthermore envisaged that a respective closing device of the plurality of closing devices is arranged between the neighboring teeth. The use of the closing devices to implement the sealing function in the previously unused space between the teeth results in the advantage of the reduction of the magnetic air gap between the stator and the rotor and the associated improved prospects of optimizing the overall system of the electric machine, especially in respect of the power density thereof. In other words, it is possible, for example, to enable a split tube in the magnetic air gap to be dispensed with by using the closing devices, or to enable an optional auxiliary split tube to be used, wherein the tube has a smaller wall thickness in comparison with customarily used split tubes. By virtue of the transfer of load absorption from a thin-walled split tube, the stability of which is at risk, to the closing devices having a smaller unsupported area, the critical stability restrictions of the design are very largely eliminated. In comparison with known electric machines, which have a conventional split tube, the magnetic air gap may thus be reduced, thereby also making it possible to improve the power density of the electric machine.

The intermediate spaces may open into a respective opening between the neighboring teeth, and the closing device has an intermediate tooth element, which closes the opening. The respective intermediate spaces between the neighboring teeth thus have an opening which faces the air gap between the stator and the rotor. The opening may be the region of the intermediate space that has the smallest cross section. In particular, the opening is arranged between the respective regions of the neighboring teeth which face the air gap. The intention is that the intermediate tooth element of the closing device may now be inserted into these respective openings. In particular, this intermediate tooth element is designed in such a way that it closes the opening leak-tightly for the cooling liquid. Furthermore, the intermediate tooth element may be designed in such a way and/or arranged in the opening in such a way that the intermediate tooth element is flush with a surface of the stator which faces the air gap. The intermediate tooth element may be offset along the radial direction of the electric machine from the surface of the stator facing the air gap. The respective intermediate tooth elements thus absorb the loads exerted by the cooling medium. The instability risk is considerably improved by the reduction of the unsupported load absorption surfaces as compared with a conventional thin-walled split tube. Moreover, there is the advantage that, through the use of the intermediate tooth elements, use is made of the previously unused space between the teeth of the stator, especially in the region of the opening, to implement the sealing function.

In one embodiment, the respective intermediate tooth elements are connected positively and/or non-positively to the neighboring teeth. By virtue of the positive and/or non-positive connection between the neighboring teeth and the intermediate tooth element, reliable sealing of the intermediate space with respect to the air gap is achieved in a simple manner. The respective intermediate tooth elements may be connected in a materially bonded manner to the neighboring teeth. For this purpose, a corresponding adhesive may be used, for example. The respective intermediate tooth elements may be connected to the neighboring teeth by a welding method or a soldering method. Joining or connection of the intermediate tooth elements to the teeth may also be achieved by other methods, (e.g., by reactive nanofilms, friction pressure joining, and/or laser methods).

In another embodiment, the respective intermediate tooth elements have at least one raised portion, and at least one of the neighboring teeth has a recess corresponding to the at least one raised portion. Alternatively, or additionally, the respective intermediate tooth elements may have at least one recess and for at least one of the neighboring teeth to have a raised portion corresponding to the at least one recess. It is possible, for example, for the intermediate tooth element to have respective raised portions on the respective sides which are associated with the neighboring teeth. Each of the teeth may have a recess corresponding to the raised portion, associated therewith, of the intermediate tooth element. In this example, the raised portions and the recesses may extend along an axial direction of the electric machine. This enables fastening of the intermediate tooth element on the neighboring teeth in the manner of a tongue and groove joint. By this embodiment, it is likewise possible to enable the intermediate tooth element to be inserted into the opening between the neighboring teeth in the axial direction, for example. The cooling liquid exerts a pressure on the intermediate tooth element. Moreover, it may be the case that thermal shrinkage of the intermediate tooth element occurs at low temperatures. By the positive engagement, it is possible to prevent the intermediate tooth elements moving out of the openings and/or leak-tightness being lost. This may be additionally provided by appropriate overdimensioning. It is also possible to provide for the intermediate tooth element to be appropriately cooled in order to enable installation in the opening by shrinkage. Alternatively, the intermediate tooth element, which is manufactured from a sealing material, for example, may be deformed elastically in the axial direction of the stator or the longitudinal direction of the tooth element in order to favor insertion into the opening through transverse contraction effects. The element may also have a recess in the lower region facing the air gap in order to favor pressing into the opening by deformation of the intermediate tooth element.

In another embodiment, the intermediate tooth element is designed with an interference fit in relation to the opening. The intermediate tooth element may thus be pressed into the opening. In this example, it is possible, in particular, to provide for the intermediate tooth element to be deformed at least in some region or regions as the intermediate tooth element is inserted into the opening. The intermediate tooth element may have a recess in the lower region facing the air gap in order to favor the insertion of the intermediate tooth element into the opening. The intermediate tooth element may be deformed elastically during insertion into the opening. It is also possible to provide for the intermediate tooth element to be appropriately cooled in order to enable installation in the opening by shrinkage. Alternatively, the intermediate tooth element may be deformed elastically in the axial direction of the stator or the longitudinal direction of the tooth element in order to favor insertion into the opening through transverse contraction effects. A nonpositive connection between the intermediate tooth element and the neighboring teeth may thus be achieved in a simple and reliable manner.

The intermediate tooth element may also be designed in such a way that it may change shape after insertion into the opening. Thus, the intermediate tooth element may have a first shape, which allows easy insertion of the intermediate tooth element into the opening. Once the intermediate tooth element has been inserted into the opening, it may have a second shape. The intermediate tooth element may be designed in the manner of an inflatable seal, for example. Furthermore, it may be manufactured from a material with a shape memory effect. Such a material may change shape owing to a corresponding stimulus, (e.g., a temperature, a pressure, a force, or the like). The intermediate tooth element may be manufactured from a shape memory alloy or from a shape memory polymer, for example. In addition, the intermediate tooth element may be of bistable design.

In another embodiment, a respective one intermediate tooth element may be secured on a respective tooth surface of the tooth. This may be accomplished by an adhesive, for example. The teeth may then be installed progressively in the circumferential direction on a corresponding device. The last tooth element may then be inserted or pressed in or shrunk in. This also applies to overdimensioned elements. In this example, the corresponding pressure on the overdimensioned tooth elements at the end of the installation process may be achieved by compressing the entire arrangement of the teeth with the intermediate tooth elements.

The respective intermediate tooth elements may be manufactured from an electrically insulating material and/or from a non-magnetic material. The intermediate tooth element may be manufactured from a material that has a low or negligible electric conductivity and/or from an electrically insulating material. It is thus possible to prevent the intermediate tooth elements from influencing the magnetic field of the electric machine.

In another embodiment, the respective intermediate tooth elements are manufactured from a fluorinated rubber, a perfluorinated rubber and/or a silicone rubber. In principle, the intermediate tooth elements may be formed from a plastic or a polymer, (e.g., from a polyether ether ketone (PEEK) or a glass-fiber-filled PEEK). The intermediate tooth elements may be formed from a fluorinated rubber (FKM) and/or from perfluorinated rubber (FFKM). Both materials are used predominantly for seals and have a high thermal and chemical resistance. Furthermore, silicone rubbers or a silicone may be used to produce the intermediate tooth elements. By a material of this kind, sealing of the intermediate spaces may be made possible in an effective manner.

In another embodiment, the respective intermediate tooth elements are manufactured from at least two materials or substances. The central region of the intermediate tooth element, relative to the vertical or the radial direction, which, in particular, has a raised portion, may be manufactured from a plastic. Sealing strips or a top part and a bottom part, composed from a sealing material such as perfluorinated rubber and/or polytetrafluoroethylene (PTFE), for example, may be arranged on this central region. Installation is made easier by the use of a stiffer central region, wherein the soft top and bottom parts provide sealing.

In another embodiment, the electric machine has end winding supports for supporting an end winding of the respective coils and/or for guiding a winding wire, wherein the end winding support has at least one element which extends in the circumferential direction of the electric machine, and wherein this element is part of the closing device. Thus, the electric machine may have a plurality of end winding supports, which are known from German Patent Application No. 10 2011 078 025 A1, for example, and may be manufactured from a plastic. In the present example, the function of these end winding supports is extended to supporting the closing device. The end winding supports may be arranged at the axial ends of the respective teeth. These end winding supports are used to support and guide the end windings of the respective winding wires. In the present case, it is envisaged that these end winding supports are appropriately modified or extended. In particular, it is envisaged that, in the circumferential direction and/or in the axial direction of the electric machine, in particular in a region facing the rotor, the end winding support is embodied in such a way that it is part of the closing device. The regions of the end winding support may be modified or extended in a region of the respective teeth associated with the rotor or the air gap. This element of the end winding support is part of the closing device and serves, optionally together with the corresponding tooth elements, in particular for sealing the respective intermediate spaces with respect to the air gap in the region of the end windings of the electric machine. In this way, the functionality of the end winding supports may be extended to the task of sealing.

It is furthermore advantageous if the at least one element of the end winding support supports at least one region of an intermediate tooth element, wherein the intermediate tooth element closes an opening into which the intermediate space between the respective neighboring teeth opens. In other words, the closing device on the one hand includes the intermediate tooth element and on the other hand includes at least one element of an end winding support. In this case, the respective end winding supports may be designed in such a way that an encircling element which assumes the task of sealing is obtained in the circumferential direction of the electric machine. The respective end winding supports may also be of integral design. The respective end winding supports may be of separate design and, for example, be arranged on the teeth of the stator. In this case, each of the end winding supports has at least one element which is then part of a closing device. It is also possible for the respective elements of two neighboring end winding supports to be part of a closing device. The intermediate tooth element may be arranged at least in some region or regions on the element of one end winding support or on the elements of neighboring end winding supports. The intermediate tooth element may thus be supported by the at least one element of the end winding support.

In another embodiment, the electric machine has a cooling device, wherein a cooling liquid delivered by the cooling device is arranged in the respective intermediate spaces. As already explained, the electric machine has, in particular, a cooling device with a cooling liquid, or is cooled by the cooling liquid. The cooling liquid serves to cool the coils of the electric machine during operation.

The electric machine may be configured without a split tube or has no split tube. The use of the respective closing device makes it possible to dispense with the split tube between the rotor and the stator. By dispensing with the split tube, it is possible to make the air gap between the stator and the rotor smaller. This allows optimization of the electric machine, especially in respect of increasing the power density. It is also possible to provide for a split tube with a reduced wall thickness to be used in comparison with a conventionally used split tube. It is possible for this auxiliary split tube to perform only an additional, redundant sealing function. It is thus possible to enable a reduction in the thickness of the split tube.

A method for producing an electric machine includes providing a stator, which has a plurality of teeth, wherein a winding of the electric machine is arranged on the teeth, wherein a respective intermediate space is formed between neighboring teeth. Moreover, the method includes providing a rotor, which is rotatable relative to the stator, such that an air gap is formed between the stator and the rotor. In this case, a respective closing device for closing the respective intermediate space in relation to the air gap may be arranged between neighboring teeth.

The embodiments presented with reference to the electric machine, and the advantages thereof, apply correspondingly to the method.

Further features of the disclosure may be found in the claims, the figures, and the description of the figures. The features and combinations of features cited above in the description and the features and combinations of features cited below in the description of the figures and/or shown in the figures alone may be used not only in the respectively indicated combination but also in other combinations, without departing from the scope of the disclosure.

BRIEF DESCRIPTION OF THE DRAWINGS

The disclosure will now be explained in more detail on the basis of the exemplary embodiments with reference to the appended drawings, in which.

Identical or functionally identical elements are provided with the same reference symbols in the figures.

DETAILED DESCRIPTION

Figure 1:
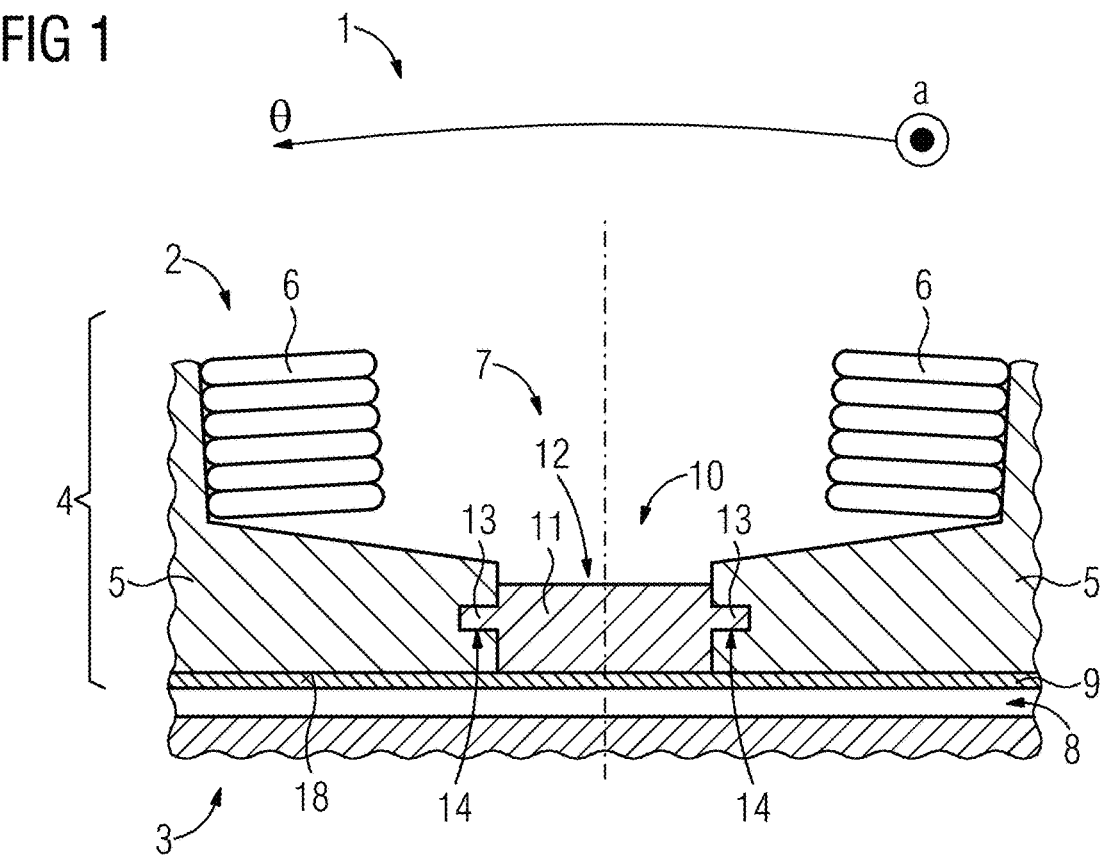
FIG. 1 shows an example of a sectional illustration of a segment of an electric machine, wherein an intermediate tooth element is arranged in an intermediate space between teeth of a stator.

FIG. 1 shows a sectional illustration of a segment of an electric machine 1, which has a stator 2 and a rotor 3. Segments of teeth 5 are shown in a stator region 4 of the stator 2 facing an air gap 8. Coils 6 of a winding of the electric machine 1 are arranged on the respective teeth 5. There is an intermediate space 7 between the two neighboring teeth 5 that are indicated in the present case. A cooling liquid may be introduced into this intermediate space 7 in order to cool the coils 6 during the operation of the electric machine.

The air gap 8 is formed between the stator 2 and the rotor 3. In this air gap 8 there is an optional split tube 9. In addition, the electric machine 1 has a plurality of closing devices 10, of which one is shown in the present case. The closing device 10 serves to close or seal the intermediate space 7 between the teeth 5 with respect to the air gap 8. The closing device 10 has an intermediate element 11, which seals the intermediate space 7 with respect to the air gap 8. This intermediate tooth element 11, which may be formed from a polymer, for example, is situated in an opening 12 into which the intermediate space 7 opens. In this case, the opening 12 faces the air gap 8.

In the exemplary embodiment, the intermediate tooth element 11 has two raised portions 13. The neighboring teeth 5 have recesses 14 corresponding to the raised portions 13. In the present case, it is envisaged that the raised portions 13 and the corresponding recesses 14 extend along an axial direction a of the electric machine 1. In this way, positive engagement may be enabled between the opening 12 and the intermediate tooth element 11. As an alternative, the intermediate tooth element 11 may be designed with an interference fit with respect to the opening 12 and for the intermediate tooth element 11 to be pressed into the opening 12. In the present case, the intermediate tooth element 11 is designed in such a way that it is flush with a surface 18 of the stator that faces the rotor 3. The intermediate tooth element 11 may be offset radially from the surface 18 of the stator 2, with the result that an opening is formed between the lower surface of the element 11 and the surface 18 of the stator 2. The intermediate tooth element 11 may be manufactured from several materials. In particular, the central region having the raised portions 13 may be manufactured from a relatively stiff material or from a plastic, for example. The remaining parts above and below, which do not have a raised portion 13, may be manufactured from a softer material, (e.g., from a sealing material). In this way, it is possible to simplify the installation of the element and to improve the sealing behavior.

Figure 2:
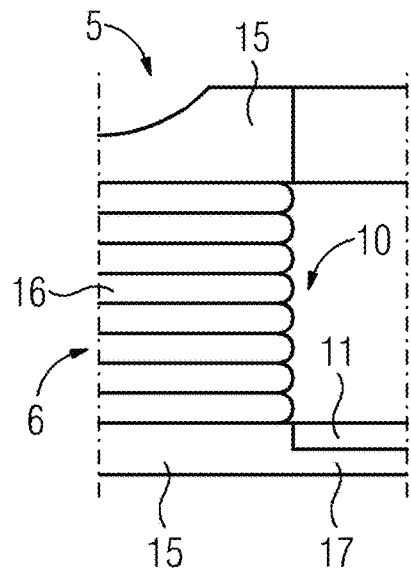
FIG. 2 shows an example of an end winding support of the stator, which has an additional element for supporting the intermediate tooth element.

FIG. 2 shows a front view of one half of one of the teeth 5 of the electric machine 1. An end winding support 15, which serves to support a respective end winding 16 of the coil 6, is arranged on each of the axial ends of this tooth 5. In the present example, the end winding 16 situated at the axial end of the coil 6 is visible. The coil 6 itself is arranged on the tooth 5, extends along the axial direction a and includes two end windings at the axial ends of the tooth 5. The end winding support 15 may be manufactured from an appropriate plastic, for example. In the present example, the end winding support 15 additionally has an element 17 that extends the end winding support 15 along a circumferential direction θ of the electric machine 1. This element 17 of the end winding support 15 is likewise part of the closing device 10. In the exemplary embodiment under consideration, the element 17 is designed to support part of the intermediate tooth element 11.

The use of the respective closing devices 10 between the neighboring teeth 5 of the stator 2 may make it possible to dispense with the split tube 9. Alternatively, a split tube 9 with a reduced wall thickness may be used. In order to provide the closing device 10, a new component in the form of an intermediate tooth element 11 is inserted, which is situated in the previously unused space between the teeth 5 of the stator 2, in particular in the region of the opening 12. Furthermore, the functionality of the end winding support 15 may be extended, with the result that the support performs a sealing task. This is achieved by an appropriate design modification along the axial and the circumferential direction of the electric machine and/or the additional element 17 of the end winding support 15.

The implementation of the sealing function within the previously unused space between the teeth 5 results in improved optimization prospects for the overall system of the electric machine 1, particularly as regards power density. By virtue of the transfer of load absorption from a possibly thin-walled split tube 9, the stability of which is at risk, to the narrow intermediate tooth elements 11, the critical stability restrictions of the design are very largely eliminated. In some circumstances, therefore, there is then only a need for an optional auxiliary split tube in the air gap 8, which merely provides additional support for the sealing function and may thus be designed with a reduced wall thickness. In the present example, the sealing of the intermediate spaces 7 is performed by the closing device 10. Thus, the magnetic air gap 8 between the stator 2 and the rotor 3 may be reduced or may be of narrower design. Overall, this promises advantages for the entire electric machine 1.

Although the disclosure has been illustrated and described in greater detail by the exemplary embodiments, the disclosure is not restricted by these exemplary embodiments. Other variations may be derived herefrom by the person skilled in the art, without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An electric machine comprising:
   a stator having a plurality of teeth and on which a winding of the electric machine is arranged, wherein a respective intermediate space is formed between neighboring teeth;
   a rotor configured to rotate relative to the stator, wherein an air gap is positioned between the stator and the rotor;
   a plurality of closing devices for closing the respective intermediate spaces in relation to the air gap, wherein a respective closing device of the plurality of closing devices is arranged between neighboring teeth, and wherein the plurality of closing devices is configured to seal the respective intermediate spaces with respect to the air gap; and
   an end winding support for supporting an end winding of respective coils, wherein the end winding support has at least one element extending in a circumferential direction of the electric machine, and wherein the at least one element is part of the respective closing device of the plurality of closing devices.

2. The electric machine of claim 1, wherein the intermediate spaces open into a respective opening between the neighboring teeth, and
wherein each closing device of the plurality of closing devices has an intermediate tooth element, which closes the respective opening.

3. The electric machine of claim 2, wherein the respective intermediate tooth elements are connected to the neighboring teeth.

4. The electric machine of claim 3, wherein the respective intermediate tooth elements have at least one raised portion, and
wherein at least one of the neighboring teeth has a recess corresponding to the at least one raised portion.

5. The electric machine of claim 3, wherein the intermediate tooth element is configured with an interference fit in relation to the respective opening.

6. The electric machine of claim 3, wherein the respective intermediate tooth elements comprise an electrically insulating material and/or a non-magnetic material.

7. The electric machine of claim 3, wherein the respective intermediate tooth elements comprise a fluorinated rubber, a perfluorinated rubber, and/or a silicone rubber.

8. The electric machine of claim 2, wherein the respective intermediate tooth elements have at least one raised portion, and
wherein at least one of the neighboring teeth has a recess corresponding to the at least one raised portion.

9. The electric machine of claim 2, wherein the intermediate tooth element is configured with an interference fit in relation to the respective opening.

10. The electric machine of claim 2, wherein the respective intermediate tooth elements comprise an electrically insulating material and/or a non-magnetic material.

11. The electric machine of claim 2, wherein the respective intermediate tooth elements comprise a fluorinated rubber, a perfluorinated rubber, and/or a silicone rubber.

12. The electric machine of claim 2, wherein each intermediate tooth element is positioned flush with a surface of the stator adjacent to the air gap.

13. The electric machine of claim 1, wherein the end winding support is positioned in such a way in the circumferential direction and in an axial direction of the electric machine, in a region facing the rotor, that the at least one element of the end winding support is part of the closing device.

14. The electric machine of claim 13, wherein the at least one element of the end winding support supports at least one region of an intermediate tooth element, and
wherein the intermediate tooth element closes an opening into which the intermediate space between the respective neighboring teeth opens.

15. The electric machine of claim 1, further comprising:
a cooling device, wherein a cooling liquid configured to be delivered by the cooling device is arranged in the respective intermediate spaces.

16. The electric machine of claim 1, wherein the at least one element of the end winding support supports at least one region of an intermediate tooth element, and
wherein the intermediate tooth element closes an opening into which the intermediate space between the respective neighboring teeth opens.

17. The electric machine of claim 1, wherein the plurality of closing devices is configured to provide a leak-tight seal for any cooling liquid provided to the intermediate space.

18. The electric machine of claim 1, wherein no split tube is positioned between the stator and the rotor, adjacent to the air gap.

19. A method for producing an electric machine, the method comprising:
providing a stator having a plurality of teeth, wherein a winding of the electric machine is arranged on the plurality of teeth and wherein a respective intermediate space is formed between neighboring teeth;
providing a rotor, which is rotatable relative to the stator, such that an air gap is formed between the stator and the rotor;
arranging a respective closing device between neighboring teeth for closing the respective intermediate space in relation to the air gap, therein providing a seal for the respective intermediate space with respect to the air gap; and
providing an end winding support for supporting an end winding of respective coils, wherein the end winding support has at least one element which extends in a circumferential direction of the electric machine, and wherein the at least one element is part of the closing device.

* * * * *